United States Patent
Zhang et al.

(10) Patent No.: US 9,226,285 B2
(45) Date of Patent: Dec. 29, 2015

(54) METHOD, DEVICE AND SYSTEM FOR SOLVING CHANNEL COLLISION

(71) Applicant: Huawei Technologies Co., Ltd., Shenzhen (CN)

(72) Inventors: Junping Zhang, Shenzhen (CN); Xueli Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 353 days.

(21) Appl. No.: 13/862,922

(22) Filed: Apr. 15, 2013

(65) Prior Publication Data

US 2013/0223297 A1     Aug. 29, 2013

Related U.S. Application Data

(63) Continuation of application No. PCT/CN2011/074045, filed on May 13, 2011.

(51) Int. Cl.
*H04W 72/04* (2009.01)
*H04L 1/18* (2006.01)
*H04L 5/00* (2006.01)

(52) U.S. Cl.
CPC .......... *H04W 72/042* (2013.01); *H04L 1/1861* (2013.01); *H04L 5/001* (2013.01); *H04L 5/0055* (2013.01)

(58) Field of Classification Search
CPC ... H04W 72/042; H04L 1/1861; H04L 5/001; H04L 5/0055
See application file for complete search history.

(56) References Cited

U.S. PATENT DOCUMENTS

2011/0305134 A1*  12/2011  Chung ............... H04L 1/1854 370/216
2013/0223297 A1*  8/2013  Zhang ............... H04L 1/1861 370/280

FOREIGN PATENT DOCUMENTS

CN    101465720 A    6/2009
CN    101527623 A    9/2009
CN    101702644 A    5/2010
(Continued)

OTHER PUBLICATIONS

Written Opinion of the International Searching Authority issued in corresponding PCT Patent Application No. PCT/CN2011/074045, mailed Aug. 18, 2011.
(Continued)

*Primary Examiner* — Ajay Cattungal
(74) *Attorney, Agent, or Firm* — Brinks Gilson & Lione

(57) ABSTRACT

The present invention relates to a method, device and system for solving channel collision, which are applied to a Long Term Evaluation Advanced (LTE-A) system. The method includes: receiving control information transmitted by a base station; transmitting uplink data to the base station according to the control information; and receiving decoding results on the uplink data from the base station, and determining the resource location of a Physical Hybrid ARQ Indicator Channel (PHICH) according to the control information, thereby determining the decoding result corresponding to a User Equipment (UE) itself. The implementation of the embodiments of the present invention can avoid the problem of collision the channel resources of the PHICH determined by the UE when the LTE-A has to be compatible with the LTE.

15 Claims, 4 Drawing Sheets

```
┌─────────────────────────────────────────────┐
│ A UE receives control information transmitted│
│ by a base station, in which the minimum value│   101
│ amongst the lowest PRB index numbers of      │
│ PUSCHs of uplink CCs is the sum of the       │
│ numbers of the PRBs of the PUSCHs of all the │
│ uplink CCs                                    │
└─────────────────────────────────────────────┘
                    │
                    ▼
┌─────────────────────────────────────────────┐   102
│ The UE transmits uplink data to the base     │
│ station according to the control information │
└─────────────────────────────────────────────┘
                    │
                    ▼
┌─────────────────────────────────────────────┐
│ The UE receives the decoding results on the  │
│ uplink data from the base station, and       │   103
│ determines a PHICH resource location         │
│ according to the control information, so as to│
│ determine a decoding result for the UE itself│
└─────────────────────────────────────────────┘
```

(56) References Cited

FOREIGN PATENT DOCUMENTS

| CN | 101827393 A | 9/2010 |
|---|---|---|
| WO | WO 2010/079977 A2 | 7/2010 |

OTHER PUBLICATIONS

International Searching Authority issued in corresponding PCT Patent Application No. PCT/CN2011/074045, mailed Aug. 18, 2011.

ETSI, "LTE; Evolved Universal Terrestrial Radio Access (E-UTRA); Physical layer procedures" (3GPP TS 36.213 version 9.3.0 Release 9), Oct. 2010, 82 pages.

Samsung, "PHICH Mapping in Asymmetric Carrier Aggregation" Agenda Item 7.2.2.2, 3GPP TSG WG1 Meeting #58bis. Miyazaki, Japan, Oct. 12-16, 2009, 3 pages.

Pantech, "PHICH Resource Allocation in LTE-Advanced" Agenda Item 7.1.3, 3GPP TSG-RAN1 Meeting #59bis. Valencia, Spain, Jan. 18-22, 2010, 4 pages.

LG Electronics Inc., "PHICH Design in Carrier Aggregation Scenarios" Agenda Item 7.1.2 PHICH, TSG-RAN WG1 Meeting #60. San Francisco, USA, Feb. 22-26, 2010, 4 pages.

Nokia et al., "PHICH Resources in LTE-Advanced" Agenda Item 7.1.2, 3GPP TSG RAN WG1 Meeting #60. San Francisco, USA, Feb. 22-26, 2010, 5 pages.

Qualcomm Incorporated, "PHICH Mapping in Support of UL MIMO Operation" Agenda Item 6.4.3, 3GPP TSG-RAN WG1 #61bis. Dresden, Germany, Jun. 28-Jul. 2, 2010, 2 pages.

LG Electronics, "PHICH Resource Assignment for UL SU-MIMO" Agenda Item 6.4.3, 3GPP TSG RAN WG1 Meeting #61bis. Jun. 28-Jul. 2, 2010, 7 pages.

* cited by examiner

METHOD, DEVICE AND SYSTEM FOR SOLVING CHANNEL COLLISION

CROSS-REFERENCE TO RELATED APPLICATION

This application is a continuation of International Application No. PCT/CN2011/074045, filed on May 31, 2011, which claims priority to Chinese Patent Application No. 201010512454.9, Oct. 14, 2010, both of which are hereby incorporated by reference in their entireties.

TECHNICAL FIELD

The present invention relates to the field of communication, and particularly to a method, device and system for solving channel collision.

BACKGROUND

Currently, the Long Term Evaluation Advanced (LTE-A) is a next generation wireless communication standard established by the 3GPP for the IMT-ADVANCED, and it is an evolved version of the Long Term Evaluation (LTE), hereinafter referred to as 4G Since the technologies of Carrier Aggregation (CA) and Anchor Carrier Component (CC) are introduced into the establishment of the LTE-A, in the CA technology the base station can use multiple carriers or bands to transmit data to a user simultaneously, so as to flexibly allocate spectrum resources, thereby not only efficiently improving spectrum utilization, but also increasing user throughput. The anchor is a control channel management technology in the CA technology, and the CA includes more than one CC. When exchanging control information with the base station, a mobile terminal needs to acquire the CC where the control channel is located, so that the terminal only detects the anchor CC of itself among all the CCs, thereby not only reducing the number of blind decoding and increasing the detection speed, but also decreasing the power consumption of the terminal. Herein, the CC where the control channel received by the terminal is located is referred to as the anchor CC in the LTE-A.

In the LTE, usually only one CC is provided for both uplink and downlink, and all the control channels are transmitted on the same CC. Thus, the terminal only needs to regularly detect control information on the CC each time. For example, in the communication process of an uplink data transmission between a base station and a terminal, the base station transmits a Physical Downlink Control Channel (PDCCH) to UEs; all the UEs monitor the PDCCH and acquire corresponding control information therefrom; the control information includes a Physical Uplink Control Channel (PUSCH) resource allocated to the UEs, as well as the minimum Physical Resource Block (PRB) index and the Demodulation Reference Symbol (DMRS) cyclic shift index of the uplink PUSCH data resource; the UE, which determines that it has been allocated with the PUSCH, starts to transmit uplink data to the base station through the PUSCH 4 ms later; the base station receives and decodes the PUSCH transmitted by the UE, and feeds back the decoding result to the UE through the Physical Hybrid ARQ Indicator Channel (PHICH); upon receiving the PHICH, the UE calculates the location of the PHICH resource according to the DMRS indexes and the lowest PRB indexes of the PUSCH resources in the control information, according to the following algorithm:

assuming that the PHICH resource location is identified as $(n_{PHICH}^{group}, n_{PHICH}^{seq})$ wherein $n_{PHICH}^{group}$ is a PHICH group number, and $n_{PHICH}^{seq}$ is the orthogonal sequence index number of the group, then the two parameters are calculated in the following equation:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{Equation (1)}$$

wherein $n_{DMRS}$ is a DMRS cyclic index number, $N_{SF}^{PHICH}$ is a PHICH spread spectrum sequence length, $I_{PRB\_RA}^{lowest\_index}$ is the lowest PRB index allocated by the uplink PUSCH resource, $N_{PHICH}^{group}$ is a PHICH group number, and $I_{PHICH}$ is 1 for TDD and 0 for FDD.

According to the above LTE solution, each UE can determine a separate PHICH channel according to the existing algorithm, and acquire the decoding result on the corresponding uplink data transmission through the channel. However, after the CA technology is introduced into the LTE-A, there may be multiple CCs, and asymmetrical uplink and downlink CC transmissions will probably occur. If the PHICH resources are calculated according to the algorithm in the LTE solution, a collision may be caused, i.e., a case where the PHICH resources calculated and determined by two UEs are the same as each other may occur, which causes misjudgment and degrades transmission quality.

In the algorithm that determines the PHICH resource location of the UE based on the LTE solution, the parameters $n_{DMRS}$ and $I_{PRB\_RA}^{lowest\_index}$ vary with the resource allocation result for the UE. In case that other parameters are unchanged, the PHICH resource location of the UE is mainly dependent upon $n_{DMRS}$ and $I_{PRB\_RA}^{lowest\_index}$. In order to solve the problem of channel resource collision, the existing LTE-A solution proposes to change the lowest PRB index number of the PUSCH allocated to each UE by each CC, so that each UE has a different lowest PRB index number, thereby ensuring that PHICH resource locations calculated and determined by different UEs are different from each other. Specifically, the PRB indexes of the uplink CCs are uniformly numbered; the PRB index numbers of uplink CC1 starts from 0, and the minimum index number of CC2 starts from the maximum PRB index number of CC1. During the implementation of the present invention, the inventors find that when a UE of the LTE accesses in the existing LTE-A solution, the lowest PRB index number of a CC accessed by the UE shall be started to be numbered from 0 according to the existing LTE solution, so as to be compatible with the UE of the LTE, thus a PHICH collision will certainly occur.

SUMMARY OF THE INVENTION

An object of the present invention is to provide a method, device and system for solving channel collision, which can avoid collision of PHICH channel resources determined by a UE when an LTE-A system solution has to be compatible with an LTE system.

An embodiment of the present invention provides a method for determining channel resources for use in a Long Term Evaluation Advanced (LTE-A) system, including:

receiving control information transmitted by a base station, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs;

transmitting uplink data to the base station according to the control information; and receiving decoding results on the uplink data fed back by the base station, and determining a Physical Hybrid ARQ Indicator Channel (PHICH) resource location according to the control information, so as to determine a corresponding decoding result from the received decoding results.

An embodiment of the present invention provides a User Equipment (UE) for use in a Long Term Evaluation Advanced (LTE-A) system, including:

a reception module configured to receive control information transmitted by a base station, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs;

a transmission module configured to transmit uplink data to the base station according to the control information; and an operation module configured to receive decoding results on the uplink data fed back by the base station, and determine a Physical Hybrid ARQ Indicator Channel (PHICH) resource location according to the control information, so as to determine a corresponding decoding result from the received decoding results.

An embodiment of the present invention provides a method for determining channel resources for use in a Long Term Evaluation Advanced (LTE-A) system, including:

transmitting user control information to a User Equipment, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs;

receiving uplink data transmitted by the User Equipment according to the control information; and decoding the uplink data, determining a Physical Hybrid ARQ Indicator Channel (PHICH) resource location where the decoding result on the PUSCH for the User Equipment is located, and feeding back the decoding result to the User Equipment through the PHICH resource location.

An embodiment of the present invention provides a base station equipment for use in a Long Term Evaluation Advanced (LTE-A) system, including:

an information transmission module configured to transmit user control information to a User Equipment, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs; and a decoding processing module configured to receive uplink data transmitted by the UE according to the control information, and decode the uplink data, determine a PHICH resource location where the decoding result on the PUSCH for the UE is located, and feed back the decoding result to the UE through the PHICH resource location.

An embodiment of the present invention provides a Long Term Evaluation Advanced (LTE-A) system, including:

a User Equipment configured to receive control information transmitted by a base station, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs; transmit uplink data to a base station according to the control information; and receive decoding results on the uplink data from the base station, and determine a Physical Hybrid ARQ Indicator Channel (PHICH) resource location according to the control information, so as to determine a decoding result for the User Equipment from the received decoding results; and a base station equipment configured to transmit the control information to the User Equipment; receive the uplink data transmitted by the User Equipment according to the control information; decode the uplink data, determine a PHICH resource location where the decoding result on the PUSCH for the User Equipment is located, and feed back the decoding result to the User Equipment through the PHICH resource location.

Beneficial Effect

According to the technical solutions of the embodiments of the present invention, the encoding mode for the lowest PRB index of a PUSCH allocated to each UE in an existing LTE-A system is changed, and the base station determines the minimum value amongst the lowest PRB index numbers of the PUSCHs of the uplink CCs according to the sum of the numbers of the PRBs of the PUSCHs of all the uplink CCs, thereby avoiding the problem of collision of PHICH channel resources determined by the UE when the LTE-A system solution has to be compatible with an LTE system.

DESCRIPTION OF THE EMBODIMENTS

The embodiments of the present invention provide a method, device and system for solving channel collision. A User Equipment receives control information transmitted by a base station, wherein in the control information, the minimum value amongst the lowest PRB index numbers of PUSCHs of uplink CCs is the sum of the numbers of the PRBs of the PUSCHs of all the uplink CCs; after transmitting the uplink data to the base station according to the control information, the User Equipment receives decoding results on the uplink data from the base station, thereby determining an unique PHICH resource location through calculation according to the control information, so as to determine a decoding result corresponding to the uplink data transmitted by the User Equipment.

By changing the lowest PRB index numbers (numbered from 0) of PUSCHs allocated to UEs by each CC in the current LTE-A system, it ensures that each UE has a different lowest PRB index number, and finally the calculation results of the PHICH resource locations of different UEs are different from each other, so as to solve the problem of collision of UE uplink locations in case of multi-carrier aggregation, thereby improving flexibility of resource allocation, eliminating UE faulty decoding caused by the resource collision, increasing transmission efficiency and decreasing UE power consumption. Meanwhile, the LTE-A system is compatible with the LTE system to avoid collision of the PHICH resource locations.

In order to further appreciate the technical solutions of the embodiments of the present invention, descriptions are given as follows with reference to the drawings.

Figure 1:
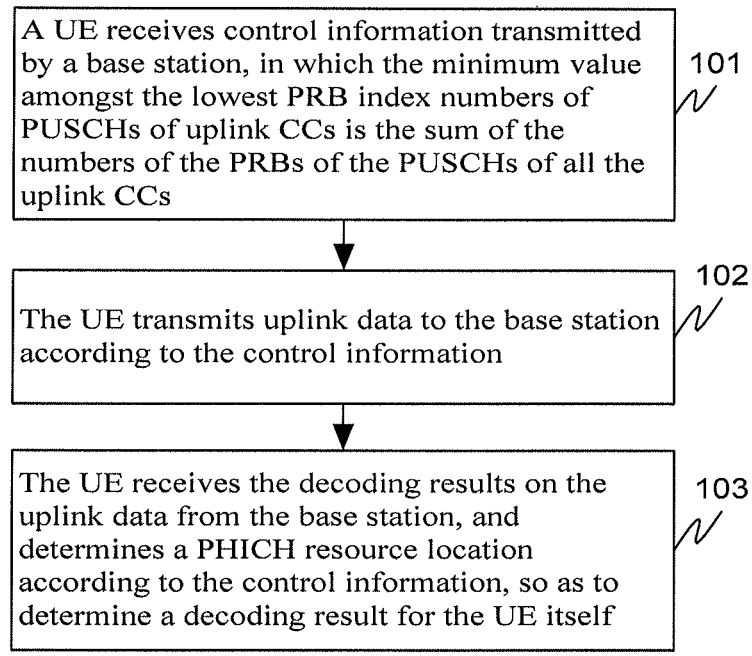
FIG. 1 is a flowchart of a method for determining channel resources according to an embodiment of the present invention.

As illustrated in FIG. 1, an embodiment of the present invention proposes a method for determining channel resources for use in an LTE-A system from the perspective of a User Equipment. The technical solution of the method is described as follows.

In step 101: a User Equipment receives control information transmitted by a base station.

In the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs.

In step 102, the User Equipment transmits uplink data to the base station according to the control information.

In step 103, the User Equipment receives decoding results on the uplink data from the base station, and determines a Physical Hybrid ARQ Indicator Channel (PHICH) resource location according to the control information, so as to determine a decoding result for the User Equipment itself.

Specifically, the base station transmits a PDCCH including the control information through a downlink CC, wherein the control information at least includes: allocation result of the PUSCH resources, the lowest PRB indexes and DMRS cyclic shift indexes of the PUSCHs. The lowest PRB indexes and the DMRS cyclic shift indexes of the PUSCHs are parameters for calculating the UE PHICH.

The lowest PRB indexes of the PUSCHs of the uplink CCs are uniformly numbered. In the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCHs of the $n-1^{th}$ CC, wherein n is a natural number larger than 1.

Figure 2:
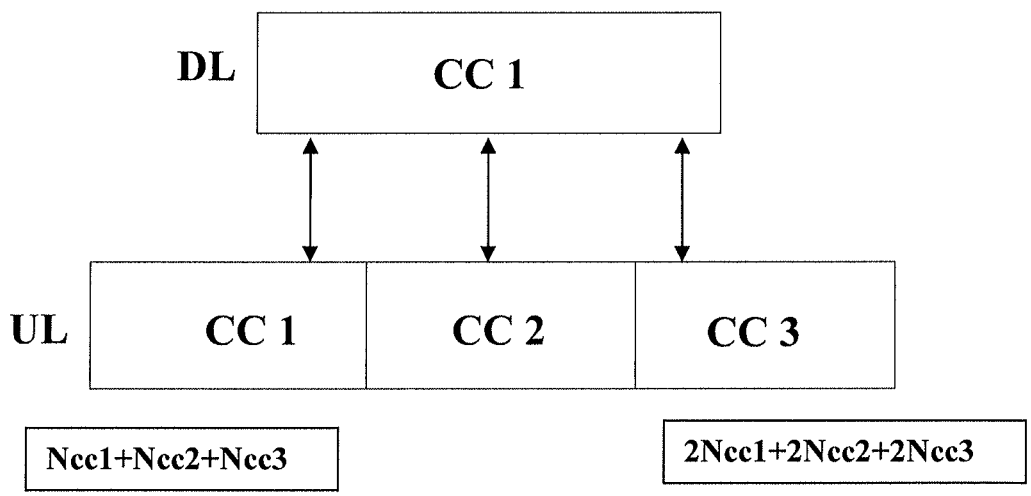
FIG. 2 is an application scenario diagram of the method for determining channel resources according to the embodiment of the present invention.

In step 101, the embodiment of the present invention changes the mode of the existing LTE-A system, in which the lowest PRB index number of the PUSCH allocated to each UE by each CC starts from 0, and takes the sum of the numbers of the PRBs of the PUSCHs of all the uplink CCs as the minimum value amongst the lowest PRB index numbers of the PUSCHs of the uplink CCs. Specifically as illustrated in FIG. 2, assuming that the numbers of the PRBs of the uplink PUSCHs of uplink CC1, uplink CC2 and uplink CC3 are Ncc1, Ncc2 and Ncc3, respectively. The minimum value amongst the lowest PRB index numbers of all the CCs is the sum of all the PRBs, i.e., the lowest PRB indexes of the PUSCHs of the uplink CCs are uniformly numbered, and in the ascending order of the sequence numbers of the CCs, if the numbering is performed from CC1, the minimum number is Ncc1+Ncc2+Ncc3; for the CC accessed by an LTE UE, the numbering is performed from 0 in the original mode. Since the minimum value amongst the lowest PRB index numbers of the CCs accessed by all LTE-A UEs is the sum of the numbers of the PRBs of all the CC, collision of channel resources can be prevented.

In step 102, multiple UEs are included in case of multi-carrier aggregation. Thus all the UEs monitor the PDCCH; after 4 ms lapse since a PDCCH is received, a UE, which determines that it is allocated with a channel resource, starts to transmit uplink data to the base station through the PUSCH.

In an embodiment of the present invention, the determining a PHICH resource location through calculation according to the control information includes:

determining a PHICH group number and the orthogonal sequence index number of the group with Equation (1) in the LTE solution, thereby determining the PHICH resource location, so as to determine a corresponding decoding result from the received multiple decoding results.

Specifically, the embodiment of the present invention improves the algorithm for determining a PHICH resource location in the LTE solution, by acquiring parameter $I_{PRB\_RA}^{lowest\_index}$ in a way proposed by the embodiment of the present invention, while acquiring other parameters in the original way of the LTE system. Specifically, the PHICH resource location of the UE is identified with $(n_{PHICH}^{group}, n_{PHICH}^{seq})$, wherein $n_{PHICH}^{group}$ is a PHICH group number, $n_{PHICH}^{seq}$ is the orthogonal sequence index number of the group, and the two parameters are calculated in the following equation:

$$n_{PHICH}^{group}=(I_{PRB\_RA}^{lowest\_index}+n_{DMRS})\bmod N_{PHICH}^{group}+I_{PHICH}N_{PHICH}^{group}$$

$$n_{PHICH}^{seq}=(\lfloor I_{PRB\_RA}^{lowest\_index}N_{PHICH}^{group}\rfloor+n_{DMRS})\bmod 2N_{SF}^{PHICH}$$

Equation (1)

wherein, $n_{DMRS}$ is a DMRS cyclic index number, $N_{SF}^{PHICH}$ is a PHICH spread spectrum sequence length, $I_{PRB\_RA}^{lowest\_index}$ is the lowest PRB index allocated by the uplink PUSCH resource (i.e., the lowest PRB index of the uplink CC corresponding to the UE), $N_{PHICH}^{group}$ is a PHICH group number, and $I_{PHICH}$ is 1 for TDD and 0 for FDD.

The value of $I_{PRB\_RA}^{lowest\_index}$ may be taken as follows: assuming that there are N uplink CCs numbered from 1 to N and the number of the uplink PRBs of the $k^{th}$ CC is prb(k), then the lowest PRB index number of the $1^{st}$ CC is shown in Equation (3), and that of the $i^{th}$ (i is a natural number larger than 1) CC is shown in Equation (2):

$$I_{PRB\_RA}^{lowest\_index}(i) = I_{PRB\_RA}^{lowest\_index}(i-1) + prb(i-1) \quad \text{Equation (2)}$$

$$I_{PRB\_RA}^{lowest\_index}(1) = \sum_{k=1}^{N} prb(k) \quad \text{Equation (3)}$$

After receiving multiple decoding results, the UE may determine its PHICH resource location through calculation according to the above Equations (1) to (3), so as to determine a decoding result corresponding to the uplink data transmitted by the UE from the multiple decoding results.

In an embodiment of the present invention, the method may further include:

when a user of an LTE system accesses in the LTE-A system, numbering the CC accessed by the user from 0 in the rule of numbering a PRB index in the LTE system.

If the LTE-A has to be compatible with an LTE system, since in the LTE-A the lowest PRB indexes allocated by the uplink PUSCH resources are not numbered from 0 but in the numbering way of the embodiment of the present invention, and the minimum value amongst the lowest PRB index numbers of the CCs accessed by all LTE-A UEs is the sum of the numbers of the PRBs of all the CCs, and thus there is no collision of PHICH channel resources calculated by the UEs, thereby well achieving the object of the present invention.

Figure 3:
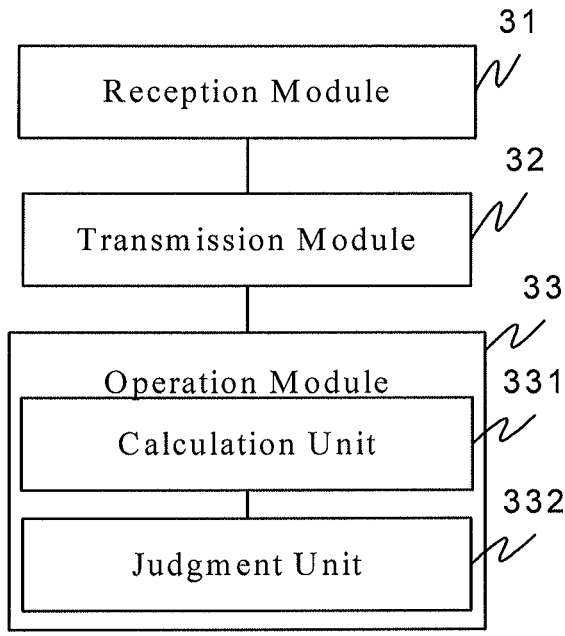
FIG. 3 is a structure diagram of a User Equipment according to an embodiment of the present invention.

As illustrated in FIG. 3, based on the method embodiment illustrated in FIG. 1, an embodiment of the present invention proposes from the perspective of a user, a User Equipment for use in an LTE-A system, including:

a reception module 31 configured to receive control information transmitted by a base station;

wherein in the control information, the minimum value amongst the lowest PRB index numbers of PUSCHs of uplink CCs is the sum of the numbers of the PRBs of the PUSCHs of all the uplink CCs;

a transmission module 32 configured to transmit uplink data to the base station according to the control information; and an operation module 33 configured to receive decoding results on the uplink data from the base station, and determine a Physical Hybrid ARQ Indicator Channel (PHICH) resource location according to the control information, so as to determine a corresponding decoding result.

In an embodiment of the present invention, the control information at least includes:

allocation result of the PUSCH resources, the lowest PRB indexes and DMRS cyclic shift indexes of the PUSCHs, wherein the lowest PRB indexes of the PUSCHs of the uplink CCs are uniformly numbered, and in the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCHs of the $n-1^{th}$ CC, wherein n is a natural number larger than 1.

In an embodiment of the present invention, the operation module 33 may further include:

a calculation unit 331 configured to determine a PHICH group number and the orthogonal sequence index number of the group with Equation (1) in the LTE solution, thereby determining the PHICH resource location; and a judgment unit 332 configured to determine a corresponding decoding result from the received decoding results according to the PHICH resource location determined through calculation.

To be noted, the embodiment of the present invention is conceived of based on the method embodiment illustrated in FIG. 1, and the two embodiments are both proposed from the perspective of a User Equipment. Thus, in the embodiment of the present invention, the functional modules are corresponding to the steps in the method embodiment illustrated in FIG. 1. The details of the functional modules can be learned from the technical solution of the method embodiment illustrated in FIG. 1, and herein are omitted.

Figure 4:
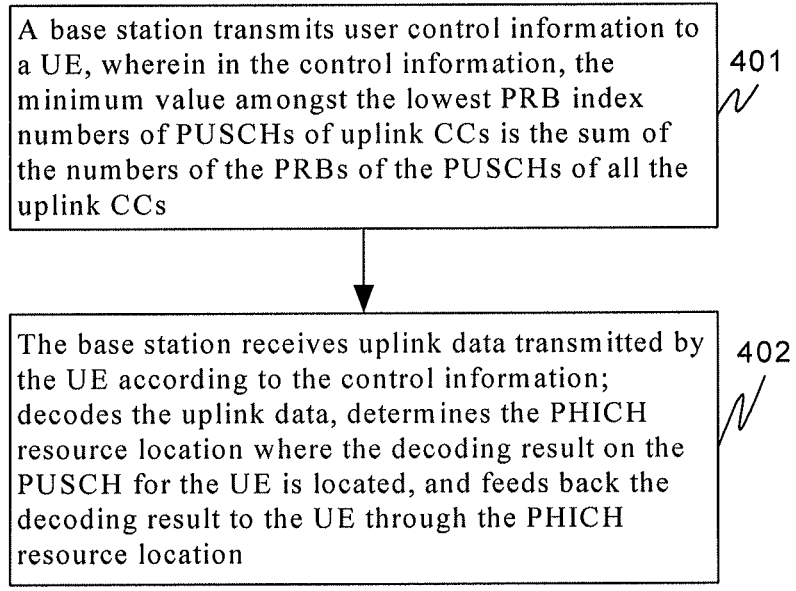
FIG. 4 is a flowchart of another method for determining channel resources according to an embodiment of the present invention.

As illustrated in FIG. 4, an embodiment of the present invention proposes a method for determining channel resources for use in an LTE-A system from the perspective of a base station equipment. The technical solution of the method is described as follows.

In step 401, a base station transmits user control information to a User Equipment.

Herein, in the control information, the minimum value amongst the lowest PRB index numbers of PUSCHs of uplink CCs is the sum of the numbers of the PRBs of the PUSCHs of all the uplink CCs.

In step 402, the base station receives uplink data transmitted by the UE according to the control information; decodes the uplink data, determines the PHICH resource location where the decoding result on the PUSCH for the UE is located, and feeds back the decoding result to the UE through the PHICH resource location.

Specifically, the base station transmits a PDCCH including the control information to the UE through a downlink CC, wherein the control information at least includes: allocation result of the PUSCH resources, the lowest PRB indexes and DMRS cyclic shift indexes of the PUSCHs. The lowest PRB indexes and the DMRS cyclic shift indexes of the PUSCHs are parameters for calculating the UE PHICH.

Specifically, the embodiment of the present invention changes the mode of the existing LTE-A system, in which the lowest PRB index numbers of PUSCHs allocated to UEs by each CC starts from 0, and takes the sum of the numbers of the PRBs of the PUSCHs of all the uplink CCs as the minimum value amongst the lowest PRB index numbers of the PUSCHs of the uplink CC. The lowest PRB indexes of the PUSCHs of the uplink CCs are uniformly numbered, and in the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCHs of the $n-1^{th}$ CC, wherein n is a natural number larger than 1. Thus, when the LTE-A system has to be compatible with an LTE user, collision of PHICH channel resources will not be caused.

Specifically, multiple UEs are included in case of multi-carrier aggregation, thus all the UEs monitor the PDCCH; after 4 ms lapse since the PDCCH is received, a UE, which determines that it is allocated with the channel resource, starts to transmit uplink data to the base station through the PUSCH.

In an embodiment of the present invention, the process of calculating and determining a PHICH resource location wherein the decoding result on the PUSCH for the UE is located according to the control information includes:

determining a PHICH group number and the orthogonal sequence index number of the group with Equation (1) in the LTE solution, thereby determining the PHICH resource location wherein the decoding result on the PUSCH for the UE is located; and transmitting the decoding result to the UE through the PHICH.

Specifically, the embodiment of the present invention improves the algorithm for determining a PHICH resource location in the LTE solution, by changing the way of acquiring the lowest PRB index number $I_{PRB\_RA}^{lowest\_index}$ allocated by the uplink PUSCH resource, while acquiring other parameters in the original way of the LTE system.

The specific way for determining a PHICH resource location in the LTE solution is given as follows.

Assuming that the PHICH resource location for the UE is identified with $(n_{PHICH}^{group}, n_{PHICH}^{seq})$, wherein $n_{PHICH}^{group}$ is a PHICH group number, $n_{PHICH}^{seq}$ is the orthogonal sequence index number of the group, and the two parameters are calculated in the following equation:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} N_{PHICH}^{group} \rfloor + n_{DMRS}) \bmod 2N_{SF}^{PHICH} \quad \text{Equation (1)}$$

wherein, $n_{DMRS}$ is a DMRS cyclic index number, $N_{SF}^{PHICH}$ is a PHICH spread spectrum sequence length, $I_{PRB\_RA}^{lowest\_index}$ is the lowest PRB index allocated by the uplink PUSCH resource (i.e., the lowest PRB index of the uplink CC corresponding to the UE), $N_{PHICH}^{group}$ is a PHICH group number, and $I_{PHICH}$ is 1 for TDD and 0 for FDD.

In the embodiment of the present invention, the value of $I_{PRB\_RA}^{lowest\_index}$ in the above algorithm may be taken as follows: assuming that there are N uplink CCs numbered from 1 to N and the number of the uplink PRBs of the $k^{th}$ CC is prb(k), then the lowest PRB index number of the $1^{st}$ CC is shown in Equation (3), and that of the $i^{th}$ (i is a natural number larger than 1) CC is shown in Equation (2):

$$I_{PRB\_RA}^{lowest\_index}(i) = I_{PRB\_RA}^{lowest\_index}(i-1) + prb(i-1) \quad \text{Equation (2)}$$

$$I_{PRB\_RA}^{lowest\_index}(1) = \sum_{k=1}^{N} prb(k) \quad \text{Equation (3)}$$

To be noted, the control information transmitted by the base station to the UE is predetermined by the base station according to the algorithm for determining a PHICH in the improved LTE solution. The base station calculates the lowest PRB index of the PUSCH for each UE, the DMRS cyclic shift index, and the PUSCH resource allocation result for each UE according to the above Equations (1) to (3) proposed by the embodiment of the present invention.

Regarding step 402, specifically, after receiving the decoding results transmitted by the base station through the PHICH, the UE determines the location information of a corresponding PHICH resource through a calculation according to the above Equations (1) to (3) proposed by the embodiment of the present invention, so as to determine a corresponding decoding result according to the calculated location information of the corresponding PHICH resource, when receiving at least one decoding result returned by the base station.

In an embodiment of the present invention, the method may further include:

when a user of an LTE system accesses in the LTE-A system, i.e., the LTE-A has to be compatible with the LTE system, numbering the CC accessed by the user from 0 in the rule of numbering PRB indexes in the LTE system.

Therefore, due to the numbering way of the embodiment of the present invention, the minimum value amongst the lowest PRB index numbers of the CCs accessed by all the LTE-A UEs is the sum of the numbers of the PRBs of all the CCs, and there is no collision of PHICH channel resources calculated by the UEs, thereby well achieving the object of the present invention.

Figure 5:
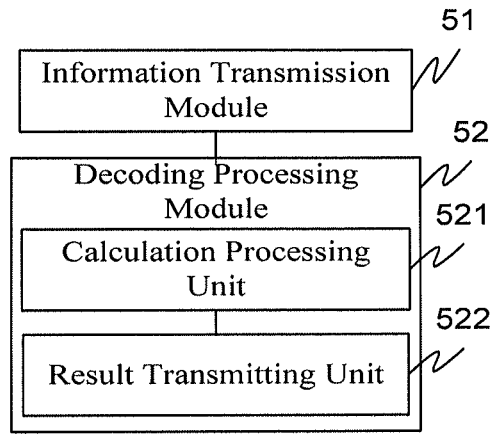
FIG. 5 is a structure diagram of a base station equipment according to an embodiment of the present invention.

As illustrated in FIG. 5, based on the method embodiment illustrated in FIG. 4, an embodiment of the present invention proposes a base station equipment for use in an LTE-A system, including:

an information transmission module 51 configured to transmit user control information to a User Equipment;

wherein in the control information, the minimum value amongst the lowest PRB index numbers of PUSCHs of uplink CCs is the sum of the numbers of the PRBs of the PUSCHs of all the uplink CCs;

a decoding processing module 52 configured to receive uplink data transmitted by the User Equipment according to the control information; decode the uplink data, determine the PHICH resource location where the decoding result on the PUSCH for the User Equipment is located, and feed back the decoding result to the User Equipment through the PHICH resource location.

In an embodiment of the present invention, the control information at least includes: allocation result of the PUSCH resources, the lowest PRB indexes and DMRS cyclic shift indexes of the PUSCHs;

wherein, the lowest PRB indexes of the PUSCHs of the uplink CC are uniformly numbered, and in the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCHs of the $n-1^{th}$ CC, wherein n is a natural number larger than 1.

In an embodiment of the present invention, the decoding processing module 52 may further include:

a calculation processing unit 521 configured to determine a PHICH group number and the orthogonal sequence index number of the group with Equation (1) in the LTE solution, thereby determining the PHICH resource location where the decoding result on the PUSCH for the User Equipment is located;

wherein, in Equation (1), the value of the lowest PRB index number $I_{PRB\_RA}^{lowest\_index}$ allocated by the uplink PUSCH resource may be taken as follows: assuming that there are N uplink CCs numbered from 1 to N and the number of the uplink PRBs of the $k^{th}$ CC prb(k), then the lowest PRB index number of the $1^{st}$ CC is shown in Equation (3), and that of the $i^{th}$ (i is a natural number larger than 1) CC is shown in Equation (2):

$$I_{PRB\_RA}^{lowest\_index}(i) = I_{PRB\_RA}^{lowest\_index}(i-1) + prb(i-1) \quad \text{Equation (2)}$$

$$I_{PRB\_RA}^{lowest\_index}(1) = \sum_{k=1}^{N} prb(k) \quad \text{Equation (3)}$$

a result transmitting unit 522 configured to feed back the decoding result to the User Equipment through the PHICH.

To be noted, the embodiment of the present invention is conceived of based on the method embodiment illustrated in FIG. 4, and the two embodiments are both proposed from the perspective of the base station. Thus in the embodiment of the present invention, the functional modules are corresponding to the steps in the method embodiment illustrated in FIG. 4. The details of the functional modules can be seen from the technical solution of the method embodiment illustrated in FIG. 4, and herein are omitted.

Figure 6:
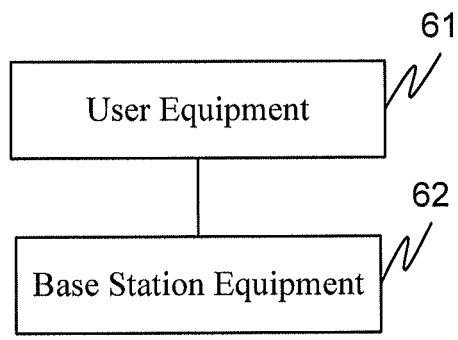
FIG. 6 is a structure diagram of an LTE-A system according to an embodiment of the present invention.

As illustrated in FIG. 6, based on the embodiments illustrated in FIGS. 3 and 5, an embodiment of the present invention proposes an LTE-A system, including:

a User Equipment 61 configured to receive control information transmitted by a base station, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs; transmit uplink data to a base station according to the control information; and receive decoding results on the uplink data from the base station, and determine a PHICH resource location according to the control information, so as to determine a decoding result for the User Equipment from the received decoding results; and a base station equipment 62 configured to transmit the control information to the User Equipment; receive the uplink data transmitted by the User Equipment according to the control information; decode the uplink data, determine a PHICH resource location where the decoding result on the PUSCH for the User Equipment is located, and feed back the decoding result to the User Equipment through the PHICH resource location.

To be noted, the LTE-A system proposed by the embodiment of the present invention includes the User Equipment described in the embodiment of FIG. 3 and the base station equipment described in the embodiment of FIG. 5. The embodiment of the present invention covers the technical solutions of the embodiments of FIGS. 3 and 5. The details can be seen from the corresponding contents in the embodiments of FIGS. 3 and 5, and herein are omitted.

The technical solution of the embodiment of the present invention is further described as follows through a complete communication process of uplink data transmission between a base station and a user terminal.

Figure 7:
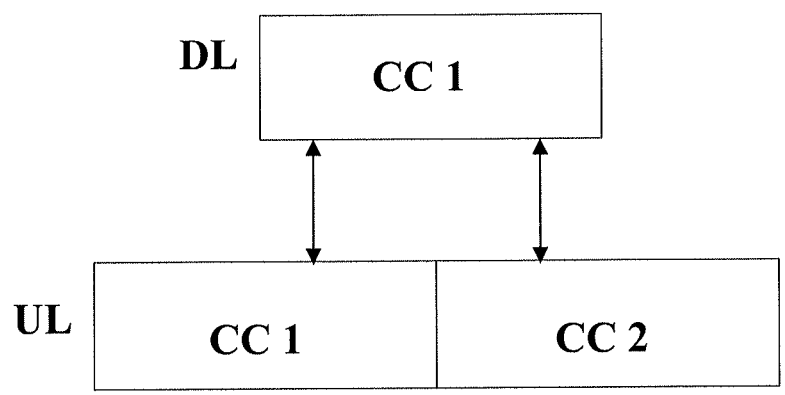
FIG. 7 is an application scenario diagram of a method for solving channel collision according to an embodiment of the present invention.

As illustrated in FIG. 7, there are two uplink CCs (CC1 and CC2) corresponding to one downlink CC (CC1); the decoding results on uplink CC1 and CC2 are both transmitted through the downlink CC1.

Figure 8:
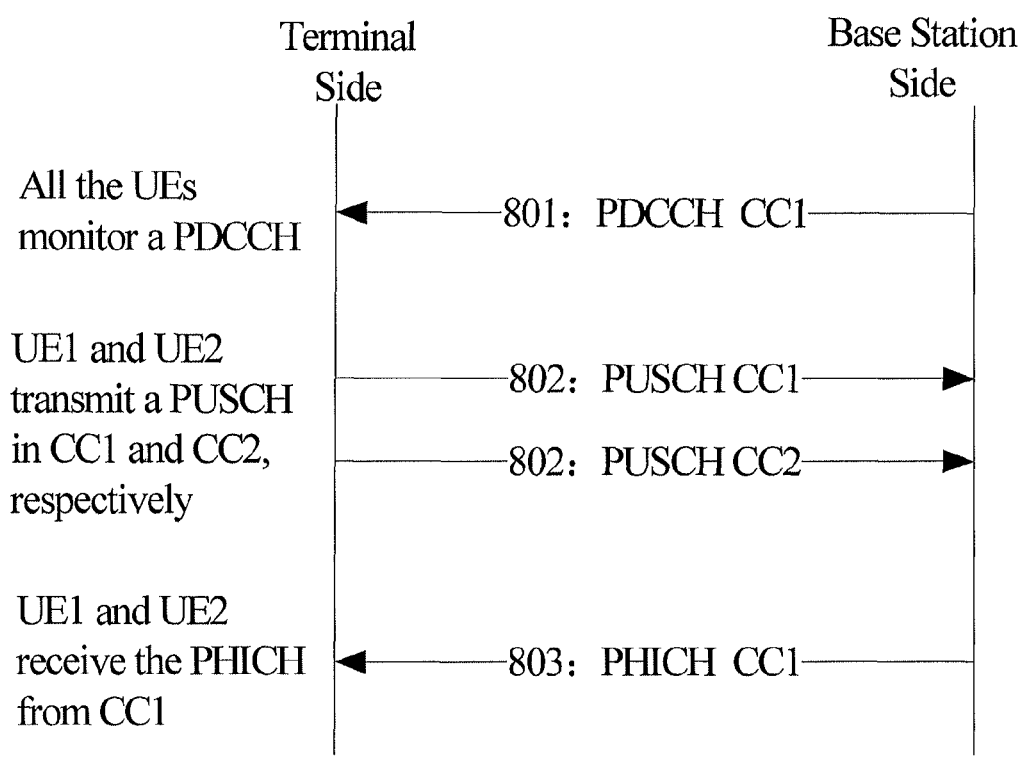
FIG. 8 is a flowchart of a method for solving channel collision according to an embodiment of the present invention.

The communication process is described hereinafter with reference to FIG. 8.

In 801, a base station transmits a PDCCH through the downlink CC1.

Specifically, the PDCCH includes the control information determined by the base station for the UEs, i.e., the allocation results of the PUSCH channel resources for UE1 and UE2, the PHICH channel calculation parameters $n_{DMRS}$ and $I_{PRB\_RA}^{lowest\_index}$ for UE1 and UE2; wherein the PHICH channel calculation parameters are acquired by the base station according to Equations (1) to (3) in the way for determining a PHICH resource location in the LTE solution proposed by the embodiment of the present invention, and the details are as follows:

Assuming that the PHICH resource location of the UE is identified as $(N_{PHICH}^{group}, n_{PHICH}^{seq})$, wherein $n_{PHICH}^{group}$ is a PHICH group number, $n_{PHICH}^{seq}$ is the orthogonal sequence index number of the group, the two parameters are calculated in the following equation:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} N_{PHICH}^{group} \rfloor + n_{DMRS}) \bmod 2N_{SF}^{PHICH} \quad \text{Equation (1)}$$

wherein $n_{DMRS}$ is a DMRS cyclic index number, $N_{SF}^{PHICH}$ is a PHICH spread spectrum sequence length, $I_{PRB\_RA}^{lowest\_index}$ is the lowest PRB index allocated by the uplink PUSCH resource (i.e., the lowest PRB index of the uplink CC corresponding to the UE), $N_{PHICH}^{group}$ is a PHICH group number, and $I_{PHICH}$ is 1 for TDD while 0 for FDD.

In the embodiment of the present invention, the value of $I_{PRB\_RA}^{lowest\_index}$ in the above algorithm may be taken as follows: assuming that there are N uplink CCs numbered from 1 to N and the number of the uplink PRBs of the $k^{th}$ CC is prb(k), then the lowest PRB index number of the $1^{st}$ CC is shown in Equation (3), and that of the $i^{th}$ (i is a natural number larger than 1) CC is shown in Equation (2):

$$I_{PRB\_RA}^{lowest\_index}(i) = I_{PRB\_RA}^{lowest\_index}(i-1) + prb(i-1) \quad \text{Equation (2)}$$

$$I_{PRB\_RA}^{lowest\_index}(1) = \sum_{k=1}^{N} prb(k) \quad \text{Equation (3)}$$

In 802, UE1 and UE2 receive and decode the PDCCH transmitted by the base station, and transmit uplink data to the base station according to the resource allocation result carried in the PDCCH, in the PDSCHs of CC1 and CC2, respectively.

In 803, the base station decodes the received uplink data transmitted through the PDSCHs, acquire the PHICH resource locations where the decoding results of UE1 and UE2 are located through calculations according to the above Equations (1) to (3), and transmit the decoding result of the PUSCHs to the respective UEs through the PHICHs of UE1 and UE2, respectively.

After receiving the PHICH decoding results transmitted by the base station, UE1 and UE2 calculate the PHICH resource locations where the decoding results of UE1 and UE2 are located according to the above Equations (1) to (3), respectively, so as to determine the respective decoding results from the obtained multiple decoding results.

According to a method, device and system for solving channel collision provided by the embodiments of the present invention, the mode of encoding the lowest PRB indexes of PUSCHs allocated to UEs in an existing LTE-A system is changed, thereby avoiding the problem of collision of PHICH channel resources determined by the UEs when the LTE-A system solution has to be compatible with an LTE system, and improving channel transmission efficiency.

A person skilled in the art will appreciate that all or a part of the flows for implementing the method embodiments may be completed by instructing relevant hardware through a computer program that may be stored in a computer readable storage medium. When the program is executed, the flows of the method embodiments are carried out. The storage medium may be a magnetic disk, an optical disk, a Read-Only Memory (ROM), a Random Access Memory (RAM), etc.

What is claimed is:

1. A method for determining channel resources for use in a Long Term Evaluation Advanced (LTE-A) system, comprising:
   receiving control information transmitted by a base station, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs;
   transmitting uplink data to the base station according to the control information; and
   receiving decoding results on the uplink data fed back by the base station, and determining a Physical Hybrid ARQ Indicator Channel (PHICH) resource location according to the control information, so as to determine a corresponding decoding result from the received decoding results.

2. The method according to claim 1, wherein the control information at least comprises:
   allocation result of PUSCH resources, the lowest PRB indexes and Demodulation Reference Symbol (DMRS) cyclic shift indexes of the PUSCHs;
   wherein the lowest PRB indexes of the PUSCHs of the uplink CCs are uniformly numbered by the base station, so that in the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCH of the $n-1^{th}$ CC, wherein n is a natural number larger than 1.

3. The method according to claim 2, wherein the determining the PHICH resource location according to the control information comprising:
  determining a PHICH group number and the orthogonal sequence index number of the group with Equation (1) in a Long Term Evaluation (LTE) solution, thereby determining the PHICH resource location, so as to determine the corresponding decoding result; wherein the PHICH resource location is identified as ($n_{PHICH}^{group}$, $n_{PHICH}^{seq}$), $n_{PHICH}^{group}$ is the PHICH group number, and $n_{PHICH}^{seq}$ is the orthogonal sequence index number of the group, and Equation (1) is as follows:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} N_{PHICH}^{group} \rfloor + n_{DMRS}) \bmod 2N_{SF}^{PHICH} \quad \text{Equation (1)}$$

wherein $n_{DMRS}$ is a DMRS cyclic index number, $N_{SF}^{PHICH}$ is a PHICH spread spectrum sequence length, $I_{PRB\_RA}^{lowest\_index}$ is the lowest PRB index of the corresponding uplink CC, $N_{PHICH}^{group}$ is the PHICH group number, and $I_{PHICH}$ is 1 for TDD and 0 for FDD.

4. The method according to claim 1, further comprising:
  numbering the CC accessed by a user of an LTE system from 0 in the rule of numbering PRB indexes in the LTE system when the user of the LTE system accesses in the LTE-A system.

5. A User Equipment for use in a Long Term Evaluation Advanced (LTE-A) system, comprising:
  a receiver, configured to receive control information transmitted by a base station, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs;
  a transmitter configured to transmit uplink data to the base station according to the control information; and
  a processor configured to receive decoding results on the uplink data fed back by the base station, and determine a Physical Hybrid ARQ Indicator Channel (PHICH) resource location according to the control information, so as to determine a corresponding decoding result from the received decoding results.

6. The User Equipment according to claim 5, wherein the control information at least comprises allocation result of PUSCH resources, the lowest PRB indexes and Demodulation Reference Symbol (DMRS) cyclic shift indexes of the PUSCHs;
  wherein the lowest PRB indexes of the PUSCHs of the uplink CCs are uniformly numbered by the base station, so that in the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCH of the $n-1^{th}$ CC, wherein n is a natural number larger than 1.

7. The User Equipment according to claim 6, wherein the processor is further configured to:
  determine a PHICH group number and the orthogonal sequence index number of the group with Equation (1) in a Long Term Evaluation (LTE) solution, thereby determining the PHICH resource location, wherein the PHICH resource location is identified as ($n_{PHICH}^{group}$, $n_{PHICH}^{seq}$), $n_{PHICH}^{group}$ is the PHICH group number, and $n_{PHICH}^{seq}$ is the orthogonal sequence index number of the group, and Equation (1) is as follows:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} N_{PHICH}^{group} \rfloor + n_{DMRS}) \bmod 2N_{SF}^{PHICH} \quad \text{Equation (1)}$$

wherein $n_{DMRS}$ is a DMRS cyclic index number, $N_{SF}^{PHICH}$ is a PHICH spread spectrum sequence length, $I_{PRB\_RA}^{lowest\_index}$ is the lowest PRB index of the uplink CC for the User Equipment, $N_{PHICH}^{group}$ is the PHICH group number, and $I_{PHICH}$ is 1 for TDD and 0 for FDD; and
  determine a decoding result for the User Equipment from the received decoding results according to the PHICH resource location determined through the calculation.

8. A method for determining channel resources for use in a Long Term Evaluation Advanced (LTE-A) system, comprising:
  transmitting user control information to a User Equipment, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs;
  receiving uplink data transmitted by the User Equipment according to the control information; and
  decoding the uplink data, determining a Physical Hybrid ARQ Indicator Channel (PHICH) resource location where the decoding result on the PUSCH for the User Equipment is located, and feeding back the decoding result to the User Equipment through the PHICH resource location.

9. The method according to claim 8, wherein the control information at least comprises:
  allocation result of PUSCH resources, the lowest PRB indexes and Demodulation Reference Symbol (DMRS) cyclic shift indexes of the PUSCHs;
  wherein the lowest PRB indexes of the PUSCHs of the uplink CCs are uniformly numbered, so that in the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCH of the $n-1^{th}$ CC, wherein n is a natural number larger than 1.

10. The method according to claim 9, wherein the determining the PHICH resource location where the decoding result on the PUSCH for the User Equipment is located according to the control information comprising:
  determining a PHICH group number and the orthogonal sequence index number of the group with Equation (1) in a Long Term Evaluation (LTE) solution, thereby determining the PHICH resource location where the decoding result on the PUSCH for the User Equipment is located;

wherein the PHICH resource location is identified as $(n_{PHICH}^{group}, n_{PHICH}^{seq})$, $n_{PHICH}^{group}$ is the PHICH group number, and $n_{PHICH}^{seq}$ is the orthogonal sequence index number of the group, and Equation (1) is as follows:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} N_{PHICH}^{group} \rfloor + n_{DMRS}) \bmod 2N_{SF}^{PHICH} \quad \text{Equation (1)}$$

wherein $n_{DMRS}$ is a DMRS cyclic index number, $N_{SF}^{PHICH}$ is a PHICH spread spectrum sequence length, $I_{PRB\_RA}^{lowest\_index}$ is the lowest PRB index of the uplink CC for the User Equipment, $N_{PHICH}^{group}$ is the PHICH group number, and $I_{PHICH}$ is 1 for TDD and 0 for FDD; and transmitting the decoding result to the User Equipment through the PHICH.

11. The method according to claim 8, further comprising:
numbering the CC accessed by a user of an LTE system from 0 in the rule of numbering PRB indexes in the LTE system when the user of the LTE system accesses in the LTE-A system.

12. A base station equipment for use in a Long Term Evaluation Advanced (LTE-A) system, comprising:
a transmitter configured to transmit user control information to a User Equipment, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs; and
a processor configured to receive uplink data transmitted by the UE according to the control information, and decode the uplink data, determine a PHICH resource location where the decoding result on the PUSCH for the UE is located, and feed back the decoding result to the UE through the PHICH resource location.

13. The base station equipment according to claim 12, wherein the control information at least comprises:
allocation result of PUSCH resources, the lowest PRB indexes and Demodulation Reference Symbol (DMRS) cyclic shift indexes of the PUSCHs;
wherein the lowest PRB indexes of the PUSCHs of the uplink CCs are uniformly numbered, so that in the ascending order of the sequence numbers of the CCs, the lowest PRB index number of the first CC is the sum of the numbers of the PRBs of the PUSCHs of all the uplink CCs, and the lowest PRB index number of the $n^{th}$ CC is the sum of the lowest PRB index number of the $n-1^{th}$ CC and the number of the PRBs of the PUSCH of the $n-1^{th}$ CC, wherein n is a natural number larger than 1.

14. The base station equipment according to claim 13, wherein the processor is further configured to:
determine a PHICH group number and the orthogonal sequence index number of the group with Equation (1) in a Long Term Evaluation (LTE) solution, thereby determining the PHICH resource location where the decoding result on the PUSCH for the UE is located; wherein the PHICH resource location is identified as $(n_{PHICH}^{group}, n_{PHICH}^{seq})$, $n_{PHICH}^{group}$ is the PHICH group number, and $n_{PHICH}^{seq}$ is the orthogonal sequence index number of the group, and Equation (1) is as follows:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} N_{PHICH}^{group} \rfloor + n_{DMRS}) \bmod 2N_{SF}^{PHICH} \quad \text{Equation (1)}$$

wherein $n_{DMRS}$ is a DMRS cyclic index number, $N_{SF}^{PHICH}$ is a PHICH spread spectrum sequence length, $I_{PRB\_RA}^{lowest\_index}$ is the lowest PRB index of the uplink CC for the User Equipment, $N_{PHICH}^{group}$ is the PHICH group number, and $I_{PHICH}$ is 1 for TDD and 0 for FDD; and transmit the decoding result to the User Equipment through the PHICH.

15. A Long Term Evaluation Advanced (LTE-A) system, comprising:
a User Equipment configured to receive control information transmitted by a base station, wherein in the control information, the minimum value amongst the lowest Physical Resource Block (PRB) index numbers of Physical Uplink Control Channels (PUSCHs) of uplink Carrier Components (CCs) is the sum of the numbers of the PRBs of the PUSCHs of all the uplink CCs; transmit uplink data to a base station according to the control information; and receive decoding results on the uplink data from the base station, and determine a Physical Hybrid ARQ Indicator Channel (PHICH) resource location according to the control information, so as to determine a decoding result for the User Equipment from the received decoding results; and
a base station equipment configured to transmit the control information to the User Equipment; receive the uplink data transmitted by the User Equipment according to the control information; decode the uplink data, determine a PHICH resource location where the decoding result on the PUSCH for the User Equipment is located, and feed back the decoding result to the User Equipment through the PHICH resource location.

* * * * *

UNITED STATES PATENT AND TRADEMARK OFFICE
CERTIFICATE OF CORRECTION

PATENT NO. : 9,226,285 B2  
APPLICATION NO. : 13/862922  
DATED : December 29, 2015  
INVENTOR(S) : Junping Zhang et al.

Page 1 of 1

It is certified that error appears in the above-identified patent and that said Letters Patent is hereby corrected as shown below:

On the Title Page

Left column, insert a new item as follows:

--(30)  Foreign Application Priority Data

October 14, 2010.......(CN)    201010512454.9--.

Signed and Sealed this
Nineteenth Day of April, 2016

Michelle K. Lee
*Director of the United States Patent and Trademark Office*